(12) United States Patent
Watanabe

(10) Patent No.: US 7,467,382 B2
(45) Date of Patent: Dec. 16, 2008

(54) INFORMATION DISTRIBUTION SYSTEM FOR TRANSMITTING SCHEDULED INFORMATION ON A TERMINAL APPARATUS DISPLAY WHEN THE USER OPERATION IS NOT ACTIVE ON THE TERMINAL APPARATUS

(75) Inventor: Hiroshi Watanabe, Chiba (JP)

(73) Assignee: Sony Corporation, Tokyo (JP)

( * ) Notice: Subject to any disclaimer, the term of this patent is extended or adjusted under 35 U.S.C. 154(b) by 926 days.

(21) Appl. No.: 10/757,918

(22) Filed: Jan. 15, 2004

(65) Prior Publication Data

US 2004/0148331 A1    Jul. 29, 2004

(30) Foreign Application Priority Data

Jan. 17, 2003    (JP)    ............................ P2003-010315

(51) Int. Cl.
*G06F 9/46*    (2006.01)
*G06F 3/048*    (2006.01)
(52) U.S. Cl. .......................... 718/100; 718/102; 715/867
(58) Field of Classification Search ................. 718/100, 718/101, 102, 103, 104, 105, 106, 107, 108; 715/867, 963
See application file for complete search history.

(56) References Cited

U.S. PATENT DOCUMENTS 5,913,040 A * 6/1999 Rakavy et al. ............... 709/232
2002/0003506 A1 * 1/2002 Freiberger et al. ........... 345/2.1
2002/0036655 A1 * 3/2002 Yulevich et al. ............. 345/744
2002/0157099 A1 * 10/2002 Schrader et al. ............... 725/51
2003/0065738 A1 * 4/2003 Yang et al. ................... 709/215
2003/0084099 A1 * 5/2003 Kamine ....................... 709/203
2004/0001087 A1 * 1/2004 Warmus et al. .............. 345/745

* cited by examiner

*Primary Examiner*—Meng-Ai An
*Assistant Examiner*—Abdullah Al Kawsar
(74) *Attorney, Agent, or Firm*—Frommer Lawrence & Haug LLP; William S. Frommer; Thomas F. Presson

(57) ABSTRACT

A terminal apparatus transmits a schedule transmission request involving a time of day given by an internal clock to a schedule transmitting apparatus, when a screen saver enters an operating condition. The schedule transmitting apparatus extracts the time of day involved in the schedule transmission request, selects a schedule the display start time of which is close to the extracted time of day, and then transmits the selected schedule to the terminal apparatus. The terminal apparatus extracts an address from the schedule and transmits a display information transmission request to a display information transmitting apparatus with reference to the extracted address. The display information transmitting apparatus transmits display information data in response to the display information transmission request. The terminal apparatus extracts display information from the display information data and then displays the extracted display information on a display.

24 Claims, 10 Drawing Sheets

FIG. 2

| SERVER SOFTWARE | UPDATE DATA RECEIVING SOFTWARE |
|---|---|
| | BASIC SOFTWARE |

F I G. 5

|   | DISPLAY START TIME | DISPLAY END TIME | DISPLAY TIME (SEC.) | ADDRESS |
|---|---|---|---|---|
| A | 2002.10.17.13:00:00 | 2002.10.17.13:15:00 | | http://www.abc123.com/info |
| B | 2002.10.17.13:15:00 | | 900 | http://www.bbb345.com/info2 |
| C | 2002.10.17.14:00:00 | 2002.10.17.14:10:00 | | http://www.ccc678.com/info |

F I G. 6

| SERVER SOFTWARE | RETRIEVAL SOFTWARE | UPDATE DATA RECEIVING SOFTWARE |
|---|---|---|
| BASIC SOFTWARE | | |

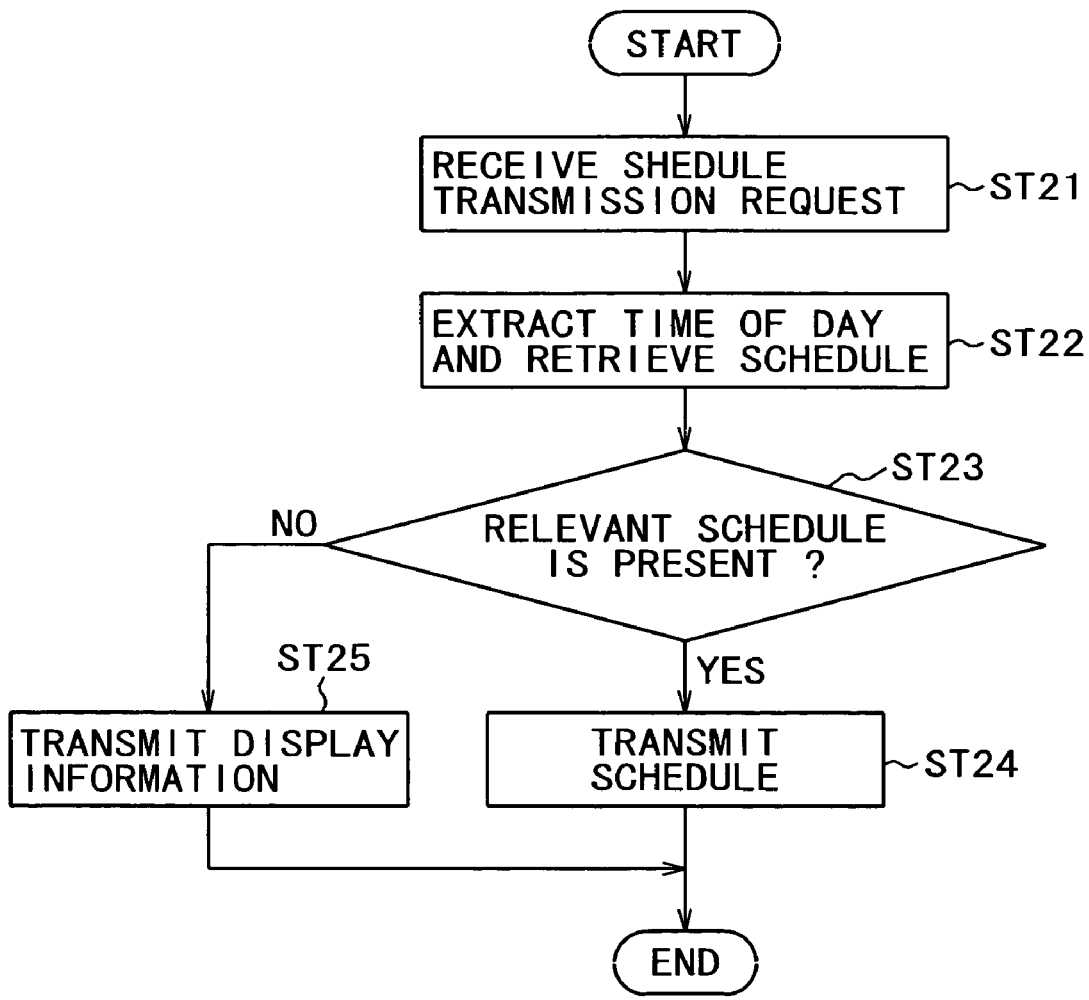
F I G. 7

INFORMATION DISTRIBUTION SYSTEM FOR TRANSMITTING SCHEDULED INFORMATION ON A TERMINAL APPARATUS DISPLAY WHEN THE USER OPERATION IS NOT ACTIVE ON THE TERMINAL APPARATUS

CROSS REFERENCE TO RELATED APPLICATION

This application claims priority from Japanese Priority Document No. 2003-010315, filed on Jan. 17, 2003 with the Japanese Patent Office, which document is hereby incorporated by reference.

BACKGROUND OF THE INVENTION

1. Field of the Invention

The present invention relates to an information distribution system for distributing information to users over a network, a terminal apparatus, a schedule transmitting apparatus, a display information transmitting apparatus, and an information distribution method, and more particularly, to an information distribution system, a terminal apparatus, a schedule transmitting apparatus, a display information transmitting apparatus and an information distribution method, which are effective in displaying information on a display of the terminal apparatus while a user is suspending an operation to the terminal apparatus for a certain period of time or more.

2. Description of the Related Art

In recent years, continuous connection of the Internet is widespread with technologies such as a Cable Television (CATV) and an Asymmetric Digital Subscriber Line (ADSL). With the spread of these technologies, a user may normally view information sites on a display connected to a terminal apparatus such as a personal computer (which is hereinafter referred to as a PC). Thus, the user is able to know sequentially updated latest information by viewing the displayed information sites for verification. For instance, it is able to obtain related information that is updated according to the progress of a television program on the air by displaying information sites relating to the television program on the air on the display of the PC, and to obtain information that is updated for each time by displaying a desired information site on the display of the terminal apparatus while the user is going on with one's work other than an operation with the PC.

By the way, the terminal apparatus executes a process of displaying an image such as a specified moving image selected by the user, for instance, on the display when an operation to the terminal apparatus by the user is suspended for a certain period of time or more. A program for carrying out this process is called a screen saver. By staring up the screen saver, it is able to prevent a Cathode Ray Tube (CRT) display from an image burn-in caused by a fact that continuous display of the same image for a long period of time leads to a change in quality of a fluorescent coating. In addition, the startup of the screen saver also may prevent a liquid crystal display from a disadvantage in that an image on the display falls under third party's eyes when the user is a part from one's own terminal apparatus for a long period of time, for instance.

When the screen saver enters an operating condition, the information sites on the display become to be not displayed. Thus, the screen saver gives rise to a problem in that the user fails to obtain the information by viewing the information sites for verification when the operation to the terminal apparatus is suspended for a certain period of time or more.

One of methods for solving the above problem is to display information on the display while the screen saver is under the operating condition. Specifically, this method is to firstly allow the terminal apparatus to store the display information of the information sites and the like, which is transmitted over a network, in a storage device mounted in the terminal apparatus. Then, when recognizing the operation of the screen saver, the terminal apparatus reads out the information from the storage device and then displays the read out information on the display (See reference literature of Japanese Laid-open Patent No. 9-244981, for instance).

However, in use of the above method, the display information that is displayed on the display while the screen saver is in the operating condition is limited to the display information stored in the storage device. That is, the display information on the display remains unchanged during the operation of the screen saver.

Thus, while the screen saver is in the operating condition, there is no possibility that the user obtains the sequentially updated latest information by viewing the information sites on the display of the terminal apparatus for verification. For instance, although the program-related information that is updated according to the progress of the television program on the air is being obtained by displaying the information site relating to the television program on the air on the display of the PC, the terminal apparatus brings the screen saver to the operating condition when the operation to the terminal apparatus is suspended, resulting in no possibility that the user may obtain the latest program-related information.

SUMMARY OF THE INVENTION

The present invention has been undertaken in view of the above problems and is intended to provide an information distribution system, which enables successively updated information to be displayed on a display even though an operation to a terminal apparatus is suspended for a certain period of time or more.

An information distribution system according to the present invention is the one that is configured by interconnecting a terminal apparatus, a display information transmitting apparatus and a schedule transmitting apparatus over a network, wherein the display information transmitting apparatus comprises a display information transmitting means for transmitting display information to the terminal apparatus upon reception of a display information transmission request transmitted from the terminal apparatus; and a transmitting display information storage means for storing the display information, the schedule transmitting apparatus comprises a transmission schedule storage means for storing a schedule table that lists a plurality of schedules each of which is composed of a set of a display start time that specifies a time of day to bring display of the display information to start, an address that identifies the display information, a display end time that specifies a time of day to bring the display of the display information to end and/or a display time that specifies a time required to display the display information; a select means for selecting a relevant schedule obtained by retrieving, from the schedule table, a schedule a display start time of which is close to a time of day received from the terminal apparatus, upon reception of the time of day from the terminal apparatus; and a schedule transmitting means for transmitting the schedule selected by the select means to the terminal apparatus, and the terminal apparatus comprises a display means for displaying the display information; an internal clock for giving a lapse of time; a time of day transmitting means for transmitting a time of day given by the internal clock to the schedule transmitting apparatus; a screen saver for displaying a given image on the display means when an operation to the terminal apparatus by a user is suspended for a certain period of time or more; a time of day transmitting means for transmitting the time of day given by the internal clock to the schedule transmitting apparatus when the given image is displayed on the display means and when the time of day to bring display of the given image to end is getting near; a schedule receiving means for receiving the schedule from the schedule transmitting apparatus; a schedule storage means for storing the schedule received by the schedule receiving means; a display information transmission request transmitting means for transmitting a display information transmission request to the display information transmitting apparatus with reference to the address listed in the schedule when the time of day given by the internal clock reaches the display start time listed in the schedule stored in the schedule storage means; a display information receiving means for receiving the display information from the display information transmitting apparatus; and a display control means for displaying the display information received by the display information receiving means on the display means.

The terminal apparatus according to the present invention is interconnected, over a network, with a display information transmitting apparatus for transmitting display information and a schedule transmitting apparatus for transmitting a schedule, and comprises a display means for displaying the display information; an internal clock for giving a lapse of time; a time of day transmitting means for transmitting a time of day given by the internal clock to the schedule transmitting apparatus; a screen saver for displaying a given image on the display means when an operation to the terminal apparatus by a user is suspended for a certain period of time or more; a time of day transmitting means for transmitting the time of day given by the internal clock to the schedule transmitting apparatus when the given image is displayed on the display means and when the time of day to bring display of the given image to end is getting near; a schedule receiving means for receiving a schedule composed of a set of a display start time that specifies a time of day to bring display of the display information to start, an address that identifies the display information, a display end time that specifies a time of day to bring the display of the display information to end and/or a display time that specifies a time required to display the display information; a schedule storage means for storing the schedule received by the schedule receiving means; a display information transmission request transmitting means for transmitting a display information transmission request to the display information transmitting apparatus with reference to the address listed in the schedule when the time of day given by the internal clock reaches the display start time listed in the schedule stored in the schedule storage means; a display information receiving means for receiving the display information from the display information transmitting apparatus; and a display control means for displaying the display information received by the display information receiving means on the display means.

The schedule transmitting apparatus according to the present invention is interconnected, over a network, with a terminal apparatus and a display information transmitting apparatus for transmitting display information to the terminal apparatus, and comprises a transmission schedule storage means for storing a schedule table that lists a plurality of schedules each of which is composed of a set of a display start time that specifies a time of day to bring display of the display information to start, a display end time that specifies a time of day to bring the display of the display information to end, a display time that specifies a time required to display the display information on a display means mounted to the terminal apparatus and an address that identifies the display information; a retrieval means for retrieving, from the schedule table, a schedule whose display start time is close to a time of day transmitted from the terminal apparatus, upon reception of the time of day from the terminal apparatus; and a schedule transmitting means for transmitting the schedule retrieved by the retrieval means to the terminal apparatus.

The display information transmitting apparatus according to the present invention is connected with a terminal apparatus over a network, and comprises a transmitting display information storage means for storing display information to be transmitted to the terminal apparatus; and a display information transmitting means for transmitting the display information stored in the transmitting display information storage means to the terminal apparatus upon reception of a display information transmission request transmitted with reference to an address from the terminal apparatus.

An information distribution method according to the present invention is that adaptable to an information distribution system configured by interconnecting a terminal apparatus, a display information transmitting apparatus and a schedule transmitting apparatus over a network, and comprises the steps of allowing the terminal apparatus to transmit a time of day given by an internal clock, which gives a lapse of time, to the schedule transmitting apparatus, while displaying a given image on a display means when an operation to the terminal apparatus by a user is suspended for a certain period of time or more; of allowing the schedule transmitting apparatus to, upon reception of the time of day from the terminal apparatus, transmit a relevant schedule to the terminal apparatus by retrieving, from schedules each of which is composed of a set of a display start time that specifies a time of day to bring display of the display information to start, a display end time that specifies a time of day to bring the display of the display information to end, a display time that specifies a time required to display the display information and an address that identifies the display information, a schedule whose display start time is close to the time of day transmitted from the terminal apparatus; of allowing the terminal apparatus to, upon reception of the above schedule, store the received schedule in a recording medium, while transmitting a display information transmission request to the display information transmitting apparatus with reference to the address listed in the schedule when the time of day given by the internal clock reaches the display start time listed in the schedule stored in the recording medium; of allowing the display information transmitting apparatus to, upon reception of the display information transmission request, transmit the display information to the terminal apparatus; and of allowing the terminal apparatus to, upon reception of the display information from the display information transmitting apparatus, display the received display information on the display means.

The information distribution system, the terminal apparatus, the display information transmitting apparatus, the schedule transmitting apparatus and the information distribution method according to the present invention provide the advantage of sequentially updating the information that is displayed on the display means while the screen saver is in the operating condition. Thus, the user may obtain the sequentially updated latest information though the operation to the terminal apparatus by the user is suspended for a long period of time.

BRIEF DESCRIPTION OF THE DRAWINGS

The features and advantages of the present invention will become apparent in the following description of the preferred embodiments of the invention taken in conjunction with the accompanying drawings, in which:

FIG. 2 is a view showing software installed in a display information transmitting apparatus that configures the information distribution system according to the present invention;

FIG. 5 is a view showing a schedule table stored in a storage device mounted in a schedule transmitting apparatus that configures the information distribution system according to the present invention;

FIG. 6 is a view showing software installed in the schedule transmitting apparatus that configures the information distribution system according to the present invention;

FIG. 7 is a flowchart showing an operation at a time when the schedule transmitting apparatus that configures the information distribution system according to the present invention transmits a schedule to the terminal apparatus;

DETAILED DESCRIPTION OF THE PREFEREED EMBODIMENTS

Hereinafter, an embodiment of the present invention is described in detail with reference to the attached drawings.

Figure 1:
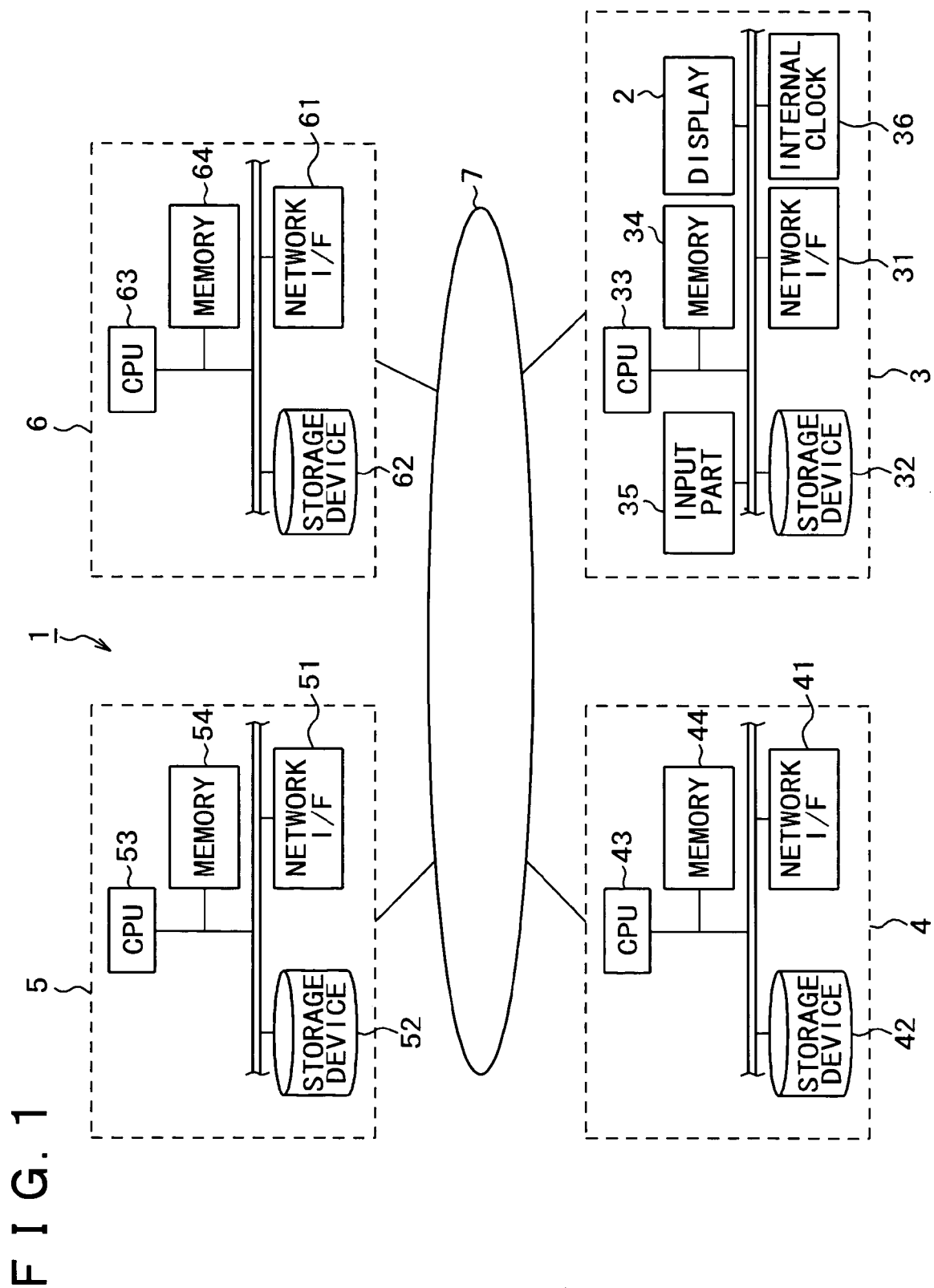
FIG. 1 is a block diagram showing a configuration of an information distribution system according to the present invention.

As shown in FIG. 1, an information distribution system 1 according to the present invention comprises a terminal apparatus 3 that displays digital content data on a display 2, a display information transmitting apparatus 4 that transmits the digital content data (which is hereinafter referred to as display information) to the terminal apparatus 3 in response to a request by the terminal apparatus 3, a schedule transmitting apparatus 5 that transmits a schedule to the terminal apparatus 3 in response to a request by the terminal apparatus 3, and a data updating apparatus 6 that updates the schedule and the display information. The terminal apparatus 3, the display information transmitting apparatus 4, the schedule transmitting apparatus 5 and the data updating apparatus 6 are interconnected over a communication network 7.

First of all, the display information transmitting apparatus 4 is described in the following. The display information transmitting apparatus 4 has a network interface (which is hereinafter referred to as a network I/F) 41 that carries out transmission/reception of data with the terminal apparatus 3, a storage device 42 that stores therein both the display information to be transmitted to the terminal apparatus 3 and software used to operate the display information transmitting apparatus 4, a central processing unit (which is hereinafter referred to as CPU) 43 that controls each of the above components, and a memory 44 that is adapted to be a work area of the CPU 43.

The display information transmitting apparatus 4 transmits the display information to the terminal apparatus 3. The display information to be transmitted to the terminal apparatus 3 by the display information transmitting apparatus 4 includes, for instance, information such as related information of a television or radio program that is on the air while the display information is displayed on the display 2. As the display information transmitting apparatus 4 transmits the display information relating to the television or radio program on the air to the terminal apparatus 3, so that a user is possible to obtain sequentially updated latest information relating to the television or radio program on the air without operating the terminal apparatus 3.

As shown in FIG. 2, the storage device 42 stores therein basic software applied to a so-called operation system, server software and update data receiving software. The server software and the update data receiving software are able to operate on the basic software. The server software is Web server software that is widespread in the world and is to perform reception of a display information transmission request transmitted from the terminal apparatus 3 and transmission of requested display information to the terminal apparatus 3 in accordance with a Hyper Text Transfer Protocol (which is hereinafter referred to as HTTP).

Upon reception of the display information transmission request transmitted from the terminal apparatus 3, the CPU 43 reads, from the storage device 42, the display information to be transmitted to the terminal apparatus 3, and then transmits the read display information as display information data to the terminal apparatus 3 through the network I/F 41 in accordance with a description of the server software.

The update data receiving software is software that allows the CPU 43 to update the display information stored in the storage device 42 with reference to display information update data transmitted from the data updating apparatus 6. The CPU 43 firstly updates the display information stored in the storage device 42 with reference to the display information update data in accordance with a description of the update data receiving software. Then, upon completion of updating of the display information, the CPU 43 creates update result data representing a result of updating. Then, the CPU 43 transmits the update result data to the data updating apparatus 6 in accordance with the description of the server software.

An operation at a time when the display information transmitting apparatus 4 transmits the display information to the terminal apparatus 3 is described as follows.

Figure 3:
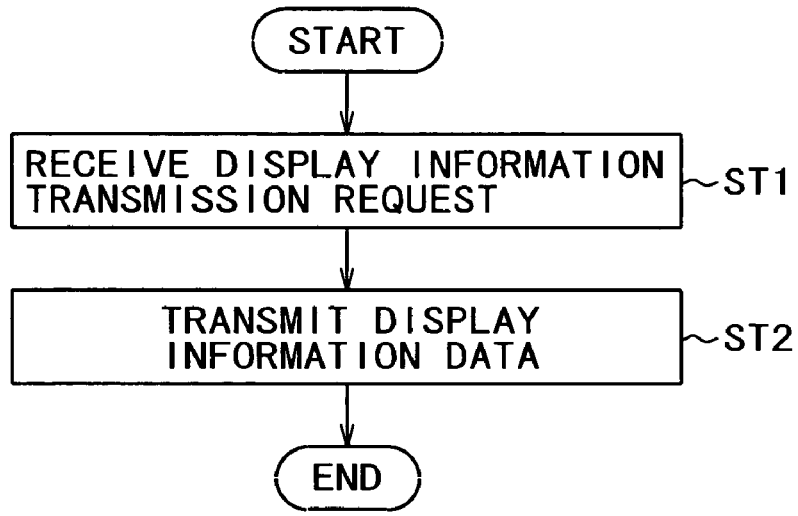
FIG. 3 is a flowchart showing an operation at a time when the display information transmitting apparatus that configures the information distribution system according to the present invention transmits display information to a terminal apparatus.

As shown in FIG. 3, firstly, the CPU 43 receives the display information transmission request transmitted from the terminal apparatus 3 at Step ST1. Then, the process goes on to Step ST2, where the CPU 43 reads, from the storage device 42, the display information to be transmitted to the terminal apparatus 3 and specifies the read out display information as display information data. Then, the CPU 43 transmits the display information data to the terminal apparatus 3.

An operation at a time when the display information transmitting apparatus 4 updates the display information stored in the storage device 42 is described as follows.

Figure 4:
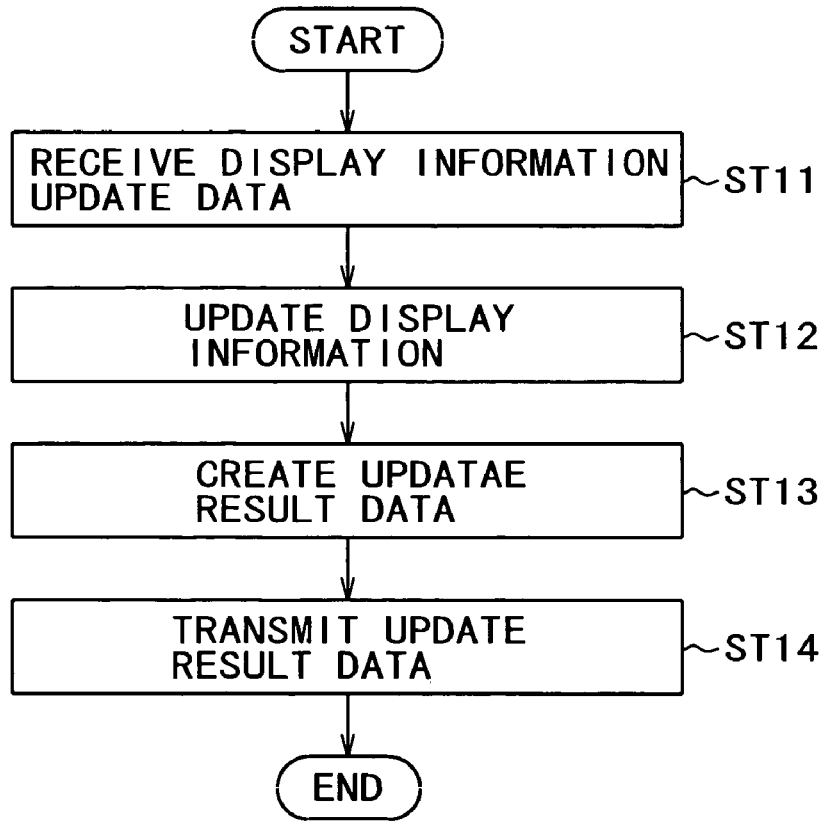
FIG. 4 is a flowchart showing an operation at a time when the display information transmitting apparatus that configures the information distribution system according to the present invention updates the display information.

As shown in FIG. 4, firstly, the CPU 43 receives the display information update data transmitted from the data updating apparatus 6 at Step ST11. Then, the process goes onto Step ST12, where the CPU 43 updates the display information stored in the storage device 42 with reference to the display information update data.

Then, the process goes on to Step ST13, where the CPU 43 creates the update result data. Then, the process goes on to Step ST14, where the CPU 43 transmits the update result data to the data updating apparatus 6.

The schedule transmitting apparatus 5 is described in the following. The schedule transmitting apparatus 5 has a network I/F 51 that carries out transmission/reception of data with the terminal apparatus 3, a storage device 52 that stores therein both a schedule table that lists a plurality of schedules to be transmitted to the terminal apparatus 3 and software used to operate the schedule transmitting apparatus 5, a CPU 53 that controls each of the above components, and a memory 54 that is adapted to be a work area of the CPU 53.

The schedule table stored in the storage device 52 is the one that lists a plurality of schedules each of which is composed of a set of a display start time that specifies a time of day to start the display of the display information on the display 2, a display end time that specifies a time of day to end the display of the display information on the display 2, or a display time that specifies a time duration to display the display information on the display 2 and an address that identifies the display information, as shown in FIG. 5, for instance. In FIG. 5, there is shown a schedule table that lists schedules A, B and C.

Alternatively, the storage device 52 may have therein a plurality of schedule tables. The user is possible to select the display information displayed on the display 2 by transmitting, to the terminal apparatus 3, a schedule listed in the schedule table selected by the terminal apparatus 3 by the schedule transmitting apparatus 5, provided that the storage device 52 stores therein the plurality of schedule tables and that the terminal apparatus 3 is configured so that the user is able to select the schedule table.

The schedule transmitting apparatus 5 retrieves, from the schedule table, the schedule having a display start time that is close to a time of day involved in a schedule transmission request transmitted from the terminal apparatus 3. Then, in the presence of the relevant schedule, the schedule transmitting apparatus 5 transmits the relevant schedule as schedule data to the terminal apparatus 3. On the contrary, in the absence of the relevant schedule, the schedule transmitting apparatus 5 transmits default display information as schedule data to the terminal apparatus 3.

The software stored in the storage device 52 includes basic software applied to a so-called operation system, server software, retrieval software and update data receiving software, as shown in FIG. 6. The server software, the retrieval software and the update data receiving software are operating on the basic software.

The update data receiving software is software that allows the CPU 53 to update the schedule stored in the storage device 52 with reference to the schedule update data transmitted from the data updating apparatus 6. The CPU 53 firstly updates the schedule stored in the storage device 52 with reference to the schedule update data received by the schedule transmitting apparatus 5 in accordance with a description of the update data receiving software. Then, upon completion of updating of the schedule, the CPU 53 creates update result data representing a result of updating. The update result data is then transmitted to the data updating apparatus 6 through the network I/F 51 in accordance with a description of the server software.

The retrieval software is software to retrieve, from the schedule table, the schedule to be transmitted to the terminal apparatus 3. When the schedule transmitting apparatus 5 receives the schedule transmission request transmitted from the terminal apparatus 3, the CPU 53 firstly extracts a time of day involved in the schedule transmission request. Then, the CPU 53 performs retrieval of the schedules stored in the storage device 52 in accordance with a description of the retrieval software to check the presence or absence of the schedule display start time which is close to the time of day involved in the received request. In the presence of the relevant schedule, the CPU 53 selects the relevant schedule.

The server software is Web server software that is widespread in the world, and is to perform an exchange of data in accordance with the HTTP. Specifically, the server software is to perform reception of the schedule transmission request transmitted from the terminal apparatus 3, and transmission of a relevant schedule as schedule data to the terminal apparatus 3 when the relevant schedule is found as a result of retrieval with the retrieval software, or transmission of default display information as schedule data to the terminal apparatus 3 when the relevant schedule is not found.

Provided that the schedule table shown in FIG. 5 is stored in the storage device 52, for instance, the transmitting apparatus 5 transmits the schedule denoted by A as the schedule data to the terminal apparatus 3 when the extracted time of day results in 12:55. Also, when the extracted time of day results in 13:20, the schedule transmitting apparatus 5 transmits the schedule denoted by B as the schedule data to the terminal apparatus 3. Further, when the extracted time of day results in 13:40, the schedule transmitting apparatus 5 transmits the default display information as the schedule data to the terminal apparatus 3.

An operation at a time when the schedule transmitting apparatus 5 transmits the schedule to the terminal apparatus 3 is described as follows.

As shown in FIG. 7, the CPU 53 firstly receives the schedule transmission request transmitted from the terminal apparatus 3 at Step ST21. Then, the process goes on to Step ST22, where the CPU 53 extracts the time of day involved in the received schedule transmission request. Then, the CPU 53 retrieves the schedule from the schedule table stored in the storage device 52 in accordance with the description of the retrieval software.

Then, the process goes on to Step ST23, where the CPU 53 judges whether or not the schedule whose display start time is close to the time of day involved in the received request is present. When it is judged that the relevant schedule is present, the process goes on to Step ST24. On the contrary, when it is judged that the relevant schedule is absent, the process goes on to Step ST25.

When the process goes on to Step ST24, the CPU 53 transmits the relevant schedule as the schedule data to the terminal apparatus 3. When the process goes on to Step ST25, the CPU 53 transmits the default display information as the schedule data to the terminal apparatus 3.

An operation at a time when the schedule transmitting apparatus 5 updates the schedule stored in the storage device 52 is described as follows.

Figure 8:
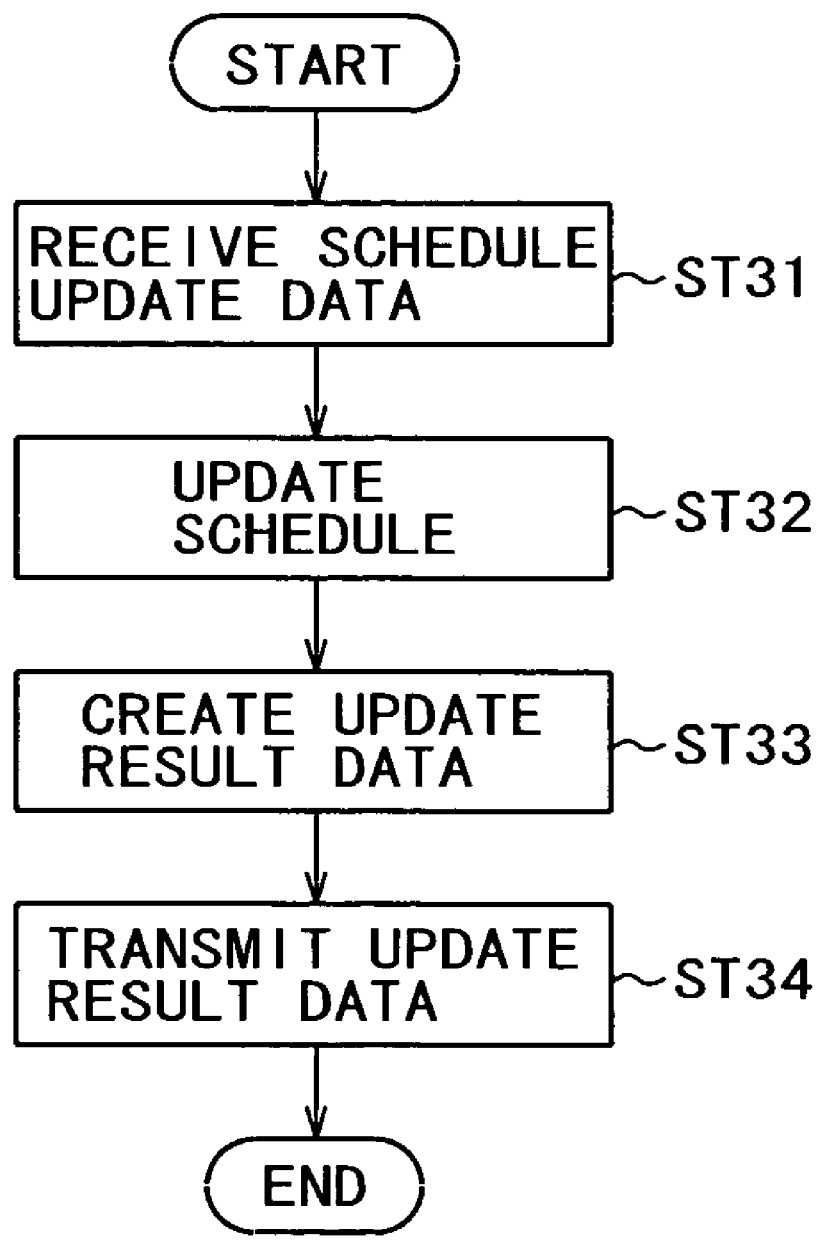
FIG. 8 is a flowchart showing an operation at a time when the schedule transmitting apparatus that configures the information distribution system according to the present invention updates the schedule.

As shown in FIG. 8, the CPU 53 firstly receives the schedule update data transmitted from the data updating apparatus 6 at Step ST31. Then, the process goes on to Step ST32, where the CPU 53 updates the schedule stored in the storage device 52 with reference to the schedule update data. Then, the process goes on to Step ST33, where the CPU 53 creates the update result data. Then, the process goes on to Step ST34, where the CPU 53 transmits the update result data to the data updating apparatus 6.

The terminal apparatus 3 is described in the following.

The terminal apparatus 3 has a network I/F 31 that exchanges data with the display information transmitting apparatus 4 and the schedule transmitting apparatus 5, a storage device 32 that stores therein both software used to operate the terminal apparatus 3 and data such as the display information transmitted from the display information transmitting apparatus 4 and the schedule transmitted from the schedule transmitting apparatus 5, a CPU 33 that controls each of the above components, a memory 34 that is adapted to be a work area of the CPU 33, an input part 35 that is to input data to the terminal apparatus 3, an internal clock 36 that gives a lapse of time and the display 2 that is to display the display information.

As one of examples of the terminal apparatus 3 include a personal computer (which is hereinafter referred to as a PC) and the like, for instance.

Figure 9:
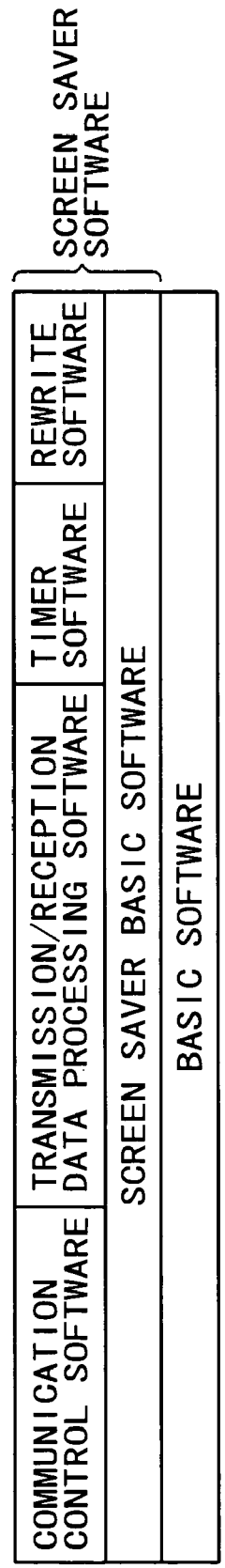
FIG. 9 is a view showing software installed in the terminal apparatus that configures the information distribution system according to the present invention.

The software stored in the storage device 32 includes basic software and screen saver software, as shown in FIG. 9. The screen saver software operates on the basic software. The screen saver software is software that displays a given image on the display when an operation such as input of data with the input part 35 in the terminal apparatus 3 is suspended for a certain period of time or more. In the following description, a process of bringing the screen saver software into execution to display the given image on the display 2 is referred to as startup of the screen saver. The screen saver software is composed of screen saver basic software, communication control software, transmission and reception data processing software, timer software and rewrite software. The communication control software, the transmission and reception data processing software, the timer software and the rewrite software operate on the screen saver basic software.

The screensaver basic software is software that controls startup and halt or the like of the screensaver. Specifically, the CPU 33 brings the screen saver to the startup in accordance with a description of the screen saver basic software when the operation to the terminal apparatus 3 is suspended for a given period of time or more. Also, the CPU 33 brings the screen saver to the halt in accordance with the description of the screen saver basic software when the operation to the terminal apparatus 3 is resumed with the screen saver to be in the operating condition. Further, the CPU 33 displays the display information transmitted from the display information transmitting apparatus 4 on the display 2 in accordance with the description of the screen saver basic software when the screen saver enters the operating condition.

The communication control software is software that carries out transmission/reception of data with the display information transmitting apparatus 4 and the schedule transmitting apparatus 5. Specifically, the CPU 33 creates the schedule transmission request involving a time of day preset in the terminal apparatus 3 and then transmits the created request to the schedule transmitting apparatus 5 through the network I/F 31 in accordance with a description of the communication control software. Also, the CPU 33 receives the schedule data transmitted from the schedule transmitting apparatus 5 through the network I/F 31 in accordance with the description of the communication control software. Further, the CPU 33 transmits the display information transmission request to the display information transmitting apparatus 4 through the network I/F 31 in accordance with the description of the communication control software. Furthermore, the CPU 33 receives the display information transmitted from the display information transmitting apparatus 4 through the network I/F 31 in accordance with the description of the communication control software.

The transmission and reception data processing software is software that processes the data transmitted to the display information transmitting apparatus 4 and the schedule transmitting apparatus 5, and also data received from the display information transmitting apparatus 4 and the schedule transmitting apparatus 5. Specifically, the CPU 33 extracts an address from the received schedule in accordance with a description of the transmission and reception data processing software. Also, the CPU 33 extracts the display information to be displayed on the display 2 from the received display information data in accordance with the description of the transmission and reception data processing software. Further, the CPU 33 creates the schedule transmission request upon reception of the time of day given by the internal clock 36 in accordance with the description of the transmission and reception data processing software. Furthermore, the CPU 33 records the display information and the schedule onto the storage device 52 in a file format or the like in accordance with the description of the transmission and reception data processing software.

The timer software is software that monitors the internal clock 36. Specifically, the CPU 33 monitors the internal clock 36 while the display of the display information is on the display 2 in accordance with a description of the timer software, and then allows the transmission and reception data processing software to create the schedule transmission request when the time of day given by the internal clock 36 is getting close to the display end time of the display information. Also, the CPU 33 monitors the internal clock 36 while the display of the display information is on the display 2 in accordance with the description of the timer software and then allows the transmission and reception data processing software to create the schedule transmission request for each given period of time. It is noted that when the schedule gives no display end time, provided that the display time is given, the CPU 33 should judge the display end time by the display start time and the display time.

The rewrite software is software that rewrites the schedule stored in the storage device 32. Upon reception of the schedule in response to the schedule transmission request transmitted for each given period of time, the CPU 33 compares the schedule stored in the storage device 32 with the received schedule in accordance with a description of the rewrite software. When the schedule stored in the storage device 32 is partly different from the received schedule, the CPU 33 rewrites the schedule stored in the storage device 32. In the present embodiment, rewriting of the schedule is carried out when there is a difference in the display end time or the display time between the schedule stored in the storage device 32 and the received schedule.

The terminal apparatus 3 may check, with reference to the schedule data transmitted from the schedule transmitting apparatus 4 for each given period of time, whether or not the schedule of the display information on the display 2 is changed.

An operation of the terminal apparatus 3 is described in the following.

Figure 10:
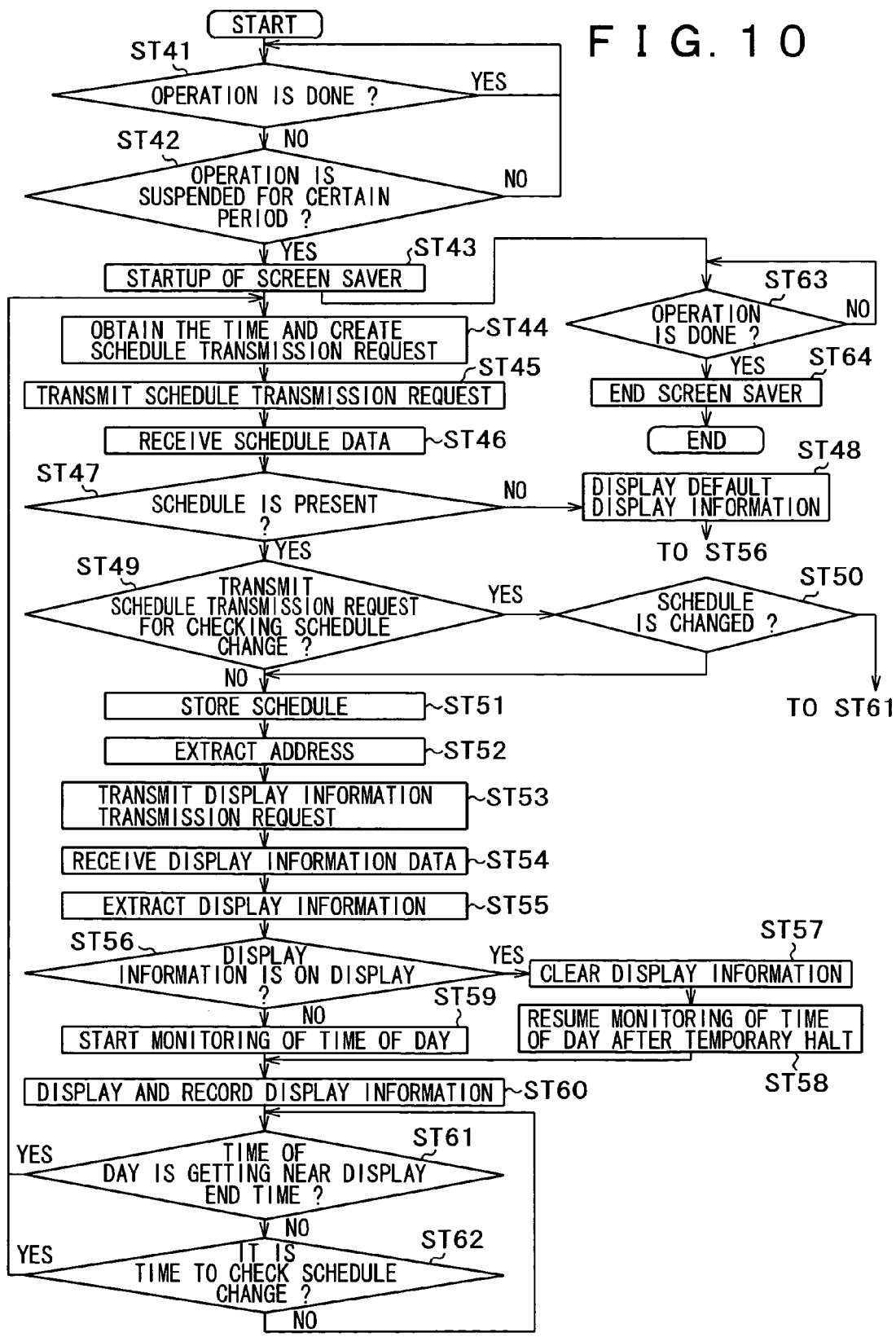
FIG. 10 is a flowchart showing an operation of the terminal apparatus that configures the information distribution system according to the present invention.

As shown in FIG. 10, the CPU 33 firstly judges whether or not the operation to the terminal apparatus 3 is done at Step ST41. When it is judged that the operation to the terminal apparatus 3 is done, the process returns to Step ST41. On the contrary, when it is judged that the operation to the terminal apparatus 3 is not done, the process goes on to Step ST42.

When the process goes on to Step ST42, the CPU 33 judges whether or not the operation to the terminal apparatus 3 is suspended for a given period of time or more. When it is judged that the operation to the terminal apparatus 3 is suspended for a period of time less than the given period of time, the process returns to Step ST41. On the contrary, when the operation to the terminal apparatus 3 is suspended for the given period of time or more, the process goes on to Step ST43. When the process goes on to Step ST43, the CPU 33 brings the screen saver to the startup, and the process further goes on to Step ST44 and Step ST62.

When the process goes on to Step ST44, the CPU 33 obtains the time of day from the internal clock 36, and creates the schedule transmission request. Then, the process goes on to Step ST45, where the CPU 33 transmits the schedule transmission request to the schedule transmitting apparatus 5. Then, the process goes on to Step ST46, where the CPU 33 receives the schedule data transmitted from the schedule transmitting apparatus 5.

Then, the process goes on to Step ST47, where the CPU 33 checks the presence or absence of the schedule with reference to the schedule data received at the process of Step ST46. In the absence of the schedule, the process goes on to Step ST48. On the contrary, in the presence of the schedule, the process goes on to Step ST49.

When the process goes on to Step ST48, the CPU 33 determines that the default display information contained in the schedule data is displayed on the display 2, and the process goes on to Step ST55.

When the process goes on to Step ST49, the CPU 33 judges whether or not transmission of the schedule transmission request is carried out in the process at Step ST45 in order to check the schedule change of the display information on the display 2. When it is judged that the transmission of the request for schedule transmission is for checking the schedule change, the process goes on to Step ST50. On the contrary, when it is judged that the above transmission is not for checking the schedule change, the process goes on to Step ST51.

When the process goes onto Step ST50, the CPU 33 compares the received schedule with the schedule stored in the storage device 32 to judge whether or not the display end time or the display time is changed. When it is judged that the display end time or the display time is changed, the process goes on to Step ST51. On the contrary, when it is judged that the display end time or the display time remains unchanged, the process goes on to Step ST61.

When the process goes on to Step ST51, the CPU 33 stores the received schedule in the storage device 32. Then, the process goes on to Step ST52, where the CPU 33 extracts the address from the schedule data. Then, the process goes on to Step ST53, where the CPU 33 transmits the display information transmission request to the display information transmitting apparatus 4 with reference to the address.

Then, the process goes on to Step ST54, where the CPU 33 receives the display information data from the display information transmitting apparatus 4. Then, the process goes on to Step ST55, where the CPU 33 extracts the display information from the received display information data. Then, the process goes on to Step ST56, where the CPU 33 judges whether or not the display information is displayed on the display 2. When it is judged that the display information is displayed on the display 2, the process goes on to Step ST57. On the contrary, when it is judged that no display information is displayed on the display 2, the process goes on to Step ST59.

When the process goes on to Step ST57, the CPU 33 clears the display information on the display 2. Then, the process goes on to Step ST58, where the CPU 33 resumes monitoring of the time of day by the timer software after a temporary halt of monitoring, and the process goes on to Step ST60. When the process goes on to Step ST59, the CPU 33 starts monitoring of the time of day by the timer software, and the process goes on to Step ST60.

When the process goes on to Step ST60, the CPU 33 displays the display information extracted in the process at Step ST55 on the display 2. Also, the CPU 33 stores the display information extracted in the process at Step ST55 in the storage device 32.

Then, the process goes on to Step ST61, where the CPU 33 judges whether or not the time of day given by the internal clock 36 is getting close to the display end time of the display information on the display 2. When it is judged that the time of day given by the internal clock 36 is getting close to the display end time, the process returns to Step ST44. On the contrary, when it is judged that the time of day given by the internal clock 36 is not close to the display end time, the process goes on to Step ST62.

When the process goes on to Step ST62, the CPU 33 judges whether or not it is a time to check the schedule change. When it is judged that it is the time to check the schedule change, the process returns to Step ST44. On the contrary, when it is judged that it is not the time to check the schedule change, the process returns to Step ST62.

It is noted that when the process goes on to Step ST63, the CPU 33 judges whether or not the operation to the terminal apparatus 3 is done. When it is judged that the operation to the terminal apparatus 3 is not done, the process returns to Step ST62. On the contrary, when it is judged that the operation to the terminal apparatus 3 is done, the process goes on to Step ST64.

When the process goes on to Step ST64, the CPU 33 brings the screen saver to the halt.

By storing the display information in the storage device 32 at Step ST59, the user is able to review the display information that is once displayed on the display 2 when the user miss the display information or after the screen saver is brought to halt. In addition, various data such as music data, image data and coupon data, for instance, other than the display information are also able to be received. Further, by storing URL of a shopping site in the storage device 32, it is able to configure a system that enables the user to purchase the goods with less need for operations.

The data updating apparatus 6 is described in the following. The data updating apparatus 6 has a network I/F 61 that carries out transmission/reception of data with the schedule transmitting apparatus 5, a storage device 62 that stores therein software used to operate the schedule updating apparatus 6, a CPU 63 that controls each of the above components, and a memory 64 that is adapted to be a work area of the CPU 63.

Specific examples of the data updating apparatus 6 include a PC, a mobile phone, a Personal Digital Assistant (which is hereinafter referred to as a PDA) and the like, for instance.

Figure 11:
FIG. 11 is a view showing software installed in a data updating apparatus that configures the information distribution system according to the present invention.

The software stored in the storage device 62 includes basic software applied to a so-called operating system and an update data transmitting software, as shown in FIG. 11. The update data transmitting software operates on the basic software.

The update data transmitting software is software that allows a display information provider, for instance, to update the display information and/or the schedule. When updating of the display information is required, the CPU 63 transmits the display information update data to the display information transmitting apparatus 4 in accordance with a description of the update data transmitting software. Then, the CPU 63 receives the update result data from the display information transmitting apparatus 4. When updating of the schedule is required, the CPU 63 transmits the schedule update data to the schedule transmitting apparatus 5 in accordance with the description of the update data transmitting software. Then, the CPU 63 receives the update result data from the schedule transmitting apparatus 5.

An operation at a time when the data updating apparatus 6 updates the display information is described as follows.

Figure 12:
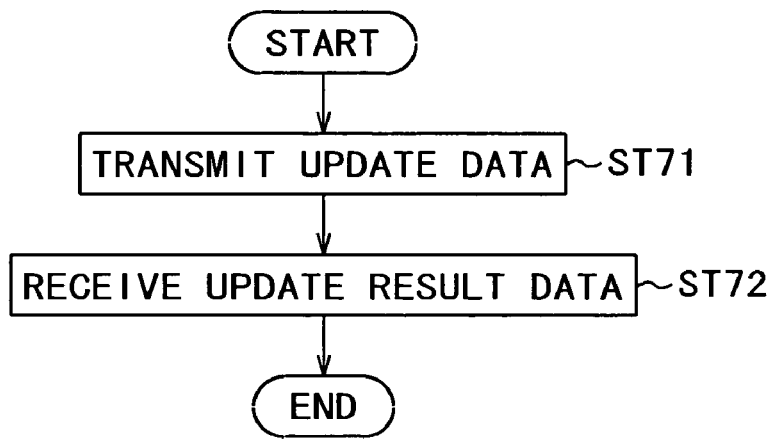
FIG. 12 is a flowchart showing an operation at a time when the data updating apparatus that configures the information distribution system according to the present invention updates the display information.

As shown in FIG. 12, the CPU 63 firstly transmits the display information update data to the display information transmitting apparatus 4 at Step ST71. Then, the process goes on to Step ST72, where the CPU 63 receives the update result data transmitted from the display information transmitting apparatus 4.

Figure 13:
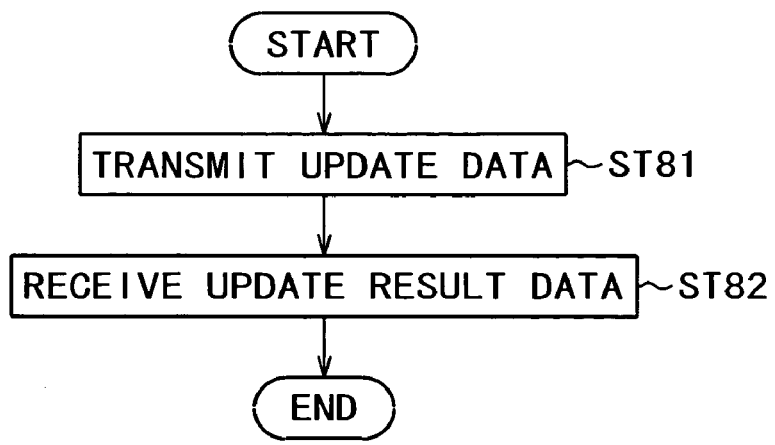
FIG. 13 is a flowchart showing an operation at a time when the data updating apparatus that configures the information distribution system according to the present invention updates the schedule.

An operation at a time when the data updating apparatus 6 transmits the schedule update data to the schedule transmitting apparatus 5 is described as follows. As shown in FIG. 13, the CPU 63 firstly transmits the schedule update data to the schedule transmitting apparatus 5 at Step ST81. Then, the process goes on to Step ST82, where the CPU 63 receives the update result data transmitted from the schedule transmitting apparatus 5.

It is noted that use of a mobile communications apparatus such as the PDA and the mobile phone as the data updating apparatus 6 enables the information provider to update the schedule and/or the display information on the run. Thus, when the information provider competes with others in price reduction, for instance, it is allowable to reflect pricing in a rival shop or shops on that in one's own shop immediately, leading to an advantage of giving information on pricing obtained in consideration of the pricing in the rival shop or shops to the user as quickly as possible.

Transmission/reception of data among the terminal apparatus 3, the display information transmitting apparatus 4, the schedule transmitting apparatus 5 and the data updating apparatus 6 are described in the following.

Figure 14:
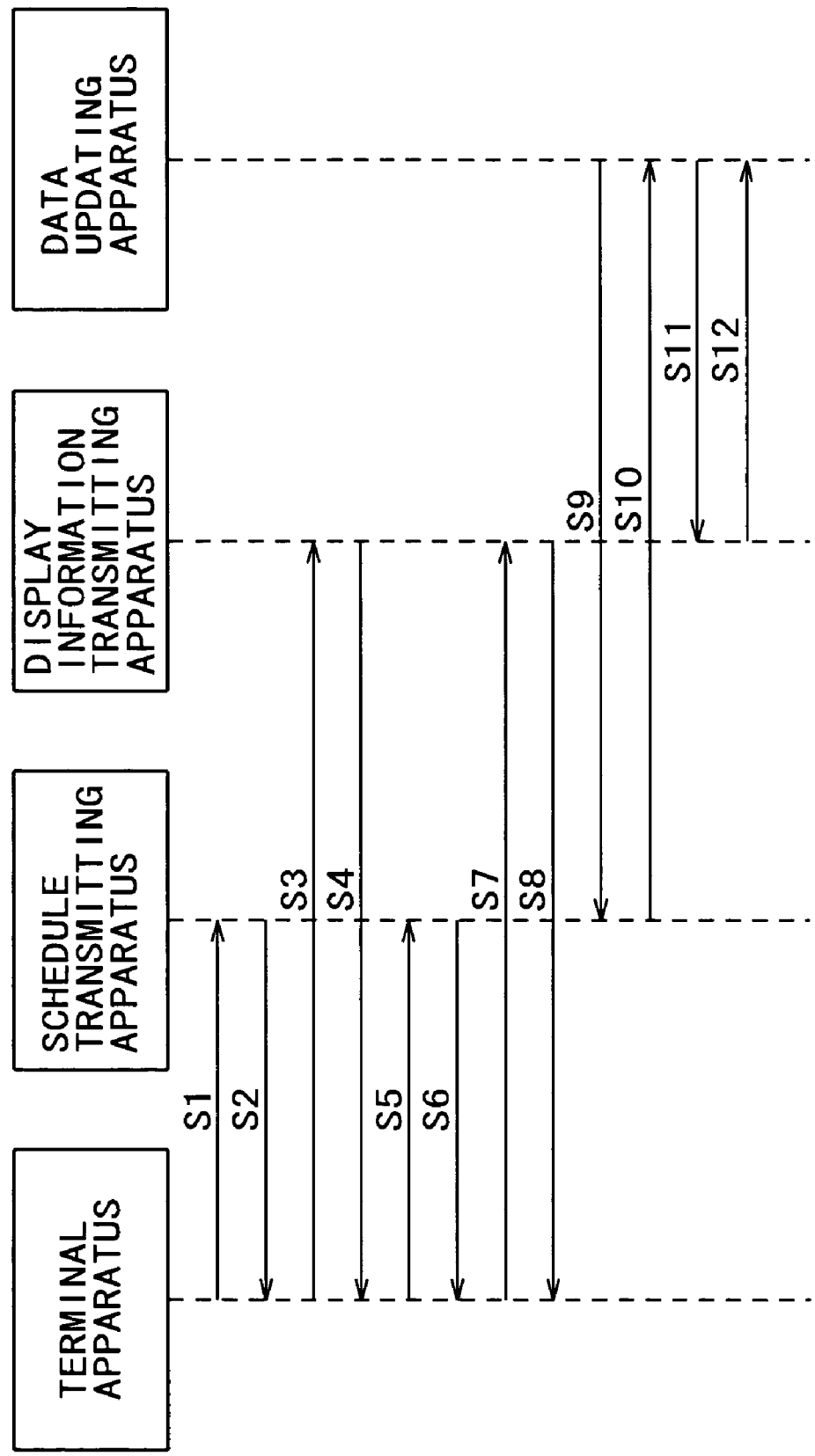
FIG. 14 is a schematic diagram showing transmission and reception of information among the display information transmitting apparatus, the schedule transmitting apparatus, the terminal apparatus and the data updating apparatus that configure the information distribution system according to the present invention.

As shown in FIG. 14, firstly when the operation to the terminal apparatus 3 is suspended for the certain period of time or more, the screen saver is brought to the startup at the terminal apparatus 3. Then, the schedule transmission request is transmitted from the terminal apparatus 3 to the schedule transmitting apparatus 5 (Refer to S1).

Then, upon reception of the schedule transmission request, the schedule transmitting apparatus 5 performs retrieval of schedules with reference to the time involved in the schedule transmission request. Then, the schedule transmitting apparatus 5 transmits the relevant schedule or the default display information as the schedule data to the terminal apparatus 3 (Refer to S2).

Then, upon reception of the schedule data, the terminal apparatus 3 judges whether or not the schedule is present. Then, when it is judged that the schedule is present, the terminal apparatus 3 extracts the address and then transmits the display information transmission request to the display information transmitting apparatus 4 in accordance with the extracted address (Refer to S3).

Then, upon reception of the display information transmission request, the display information transmitting apparatus 4 transmits the display information to the terminal apparatus 3 (Refer to S4).

Then, the terminal apparatus 3 starts monitoring of the time of day given by the internal clock 36, and also displays the display information on the display 2. Then, the terminal apparatus 3 transmits the schedule transmission request to the schedule transmitting apparatus 5 for each given period of time (Refer to S5).

Then, the schedule transmitting apparatus 5 performs retrieval of schedules with reference to the time of day involved in the schedule transmission request whenever the schedule transmission request is received. Then, the schedule transmitting apparatus 5 transmits the relevant schedule or the default display information as the schedule data to the terminal apparatus 3 (Refer to S6). When the schedule is changed, the terminal apparatus 3 carries out the update of the schedule.

Then, the terminal apparatus 3 transmits the schedule transmission request to the schedule transmitting apparatus 5 when the time of day given by the internal clock 36 is getting close to the display end time of the display information on the display 2 (Refer to S7).

Then, the schedule transmitting apparatus 5 transmits the schedule to the terminal apparatus 3 (Refer to S8). The terminal apparatus 3 updates the display information to be displayed on the display 2.

When the schedule is changed, the data updating apparatus 6 transmits the schedule update data to the schedule transmitting apparatus 5 (Refer to S9). Upon reception of the schedule update data, the schedule transmitting apparatus 5 updates the schedule. Then, the schedule transmitting apparatus 5 creates the update result data and then transmits the created update result data to the data updating apparatus 6 (Refer to S10).

Further, when the display information is changed, the data updating apparatus 6 transmits the display information update data to the display information transmitting apparatus 4 (Refer to S11).

Upon reception of the display information update data, the display information transmitting apparatus 4 updates the display information. Then, the display information transmitting apparatus 4 creates the update result data and then transmits the created update result data to the data updating apparatus 6 (Refer to S12).

As described in the foregoing, the information distribution system 1 according to the present invention is able to sequentially update the information that is displayed on the display 2 at a time of the startup of the screen saver in the terminal apparatus 3. Thus, the user may obtain the sequentially updated latest information even though the operation to the terminal apparatus 3 is suspended for a long period of time.

Also, the information distribution system 1 according to the present invention allows the terminal apparatus 3 to transmit the schedule transmission request to the schedule transmitting apparatus 5 for each given period of time. Specifically, the information distribution system 1 may quickly react to the schedule change, resulting in display of the latest display information. Thus, the information distribution system 1 enables the information provider to provide the updated display information for the user immediately, and enabling the user to obtain the updated information.

The information distribution system 1 according to the present invention may employ the existing technologies and/or the existing products as the hardware and/or the software. Thus, the information distribution system 1 according to the present invention is considered to be available at low cost, leading to an advantage of prompting information providers in various fields to use.

Also, the information distribution system 1 according to the present invention easily attains not only transmission of the display information to the terminal apparatuses 3 within a limited narrow area but also transmission of the display information to the terminal apparatuses 3 in a wide area, leading to an advantage of easily distributing information such as information that is full of a locality to information that is serviceable in the wide area.

Also, the information distribution system 1 according to the present invention allows the display information transmitting apparatus 4 to transmit the display information to the terminal apparatus 3 with reference to the time of day given by the internal clock 36. Thus, the terminal apparatus 3 may obtain the schedule created with reference to different local times by varying the time of day given by the internal clock 36, leading to an advantage of viewing the display information for verification in areas different in local time.

Also, the information distribution system 1 according to the present invention is effective in transmitting the same information as so-called inserted ads in the newspapers to the terminal apparatus 3, so that the information provider may attain saving of paper resources or advertising cost reductions.

Also, the information distribution system 1 according to the present invention is effective in displaying the display information by watching for a time zone such as mealtime, for instance, at which the operation to the terminal apparatus 3 is supposed to be suspended for a long period of time.

It is noted that the information distribution system 1 may be modified so that the terminal apparatus 3 has a decipher unit, provided that the display information transmitted from the display information transmitting apparatus 4 to the terminal apparatus 3 is encrypted. Encryption of the display information may set a limit to users who are authorized to view the display information on the display 2.

It is noted that the information distribution system 1 may be also modified so that the schedule transmitting apparatus 5 has a counting section that counts the number of display information transmitted as last display information that specifies display information being displayed on the display when the operation to the terminal apparatus 3 is done while the screen saver is in the operating condition, provided that the terminal apparatus 3 has a last display information transmitting part that transmits the last display information to the schedule transmitting apparatus 5. The display information being displayed on the display 2 when the operation to the terminal apparatus 3 is done is supposed to be one having been viewed by the user for verification without fail. Thus, with the information distribution system 1 having the above configuration, it is allowable to sum up the number of display information viewed by the user for verification.

What is claimed is:

1. An information distribution system wherein a terminal apparatus, a display information transmitting apparatus, and a schedule transmitting apparatus are interconnected over a network, wherein:

said display information transmitting apparatus comprises:
  display information transmitting means for transmitting display information to the terminal apparatus upon reception of a display information transmission request transmitted from the terminal apparatus; and
  transmitting display information storage means for storing the display information, said schedule transmitting apparatus comprises:
  transmission schedule storage means for storing a schedule table that lists a plurality of schedules comprising a set of a display start time that specifies a time of day to start displaying the display information, an address that identifies the display information, a display end time that specifies a time of day to end displaying the display information and/or a display period that specifies a time duration for displaying the display information;
  selecting means for selecting a first schedule by retrieving, from the schedule table, a schedule whose display start time is close to a time of day received from the terminal apparatus, upon reception of the time of day from the terminal apparatus; and
  schedule transmitting means for transmitting the first schedule selected by the selecting means to the terminal apparatus; and said terminal apparatus comprises:
  display means for displaying the display information;
  an internal clock for giving a lapse of time;
  screen saver for displaying a given image on the display means when an operation to the terminal apparatus by a user is suspended for a certain period of time or longer;
  time of day transmitting means for transmitting the time of day given by the internal clock to the schedule transmitting apparatus when the given image is displayed on the display means and when the display end time is getting close;
  schedule receiving means for receiving the first schedule from the schedule transmitting apparatus;
  schedule storage means for storing the first schedule received by the schedule receiving means;
  display information transmission request transmitting means for transmitting a display information transmission request to the display information transmitting apparatus with reference to the address listed in the first schedule when the time of day given by the internal clock reaches the display start time listed in the schedule stored in the schedule storage means;
  display information receiving means for receiving the display information from the display information transmitting apparatus; and
  display control means for displaying the display information received by the display information receiving means on the display means,
  wherein the display information is capable of being updated by a mobile phone, or a Personal Digital Assistant, and
  wherein the terminal apparatus periodically sends a schedule transmission request to the schedule transmitting apparatus to request latest schedule information, said terminal apparatus further comprises:
schedule rewriting means for rewriting the first schedule stored in said schedule storage means with a second schedule received by said schedule receiving means, when a different portion between the first schedule and the second schedule is determined by said terminal apparatus;
said time of day transmitting means transmits the time of day given by the internal clock to the schedule transmitting apparatus at a predetermined interval during the display period when said display information is displayed; and
said schedule rewriting means rewrites the first schedule with the second schedule, when a different portion between the first schedule and the second schedule is determined by said terminal apparatus at the time when the second schedule received by said schedule receiving means is transmitted from said schedule transmitting apparatus based on the time of day transmitted to said schedule transmitting apparatus at said predetermined interval,
wherein said display information is related to a television or radio program that is on the air during the display period when the display information is displayed on the display means.

2. The information distribution system as claimed in claim 1, wherein:
said schedule rewriting means rewrites the first schedule with the second schedule, when either said display end time or said display period is different determined by the terminal apparatus.

3. The information distribution system as claimed in claim 1, wherein: said terminal apparatus further comprises display information storage means for storing display information displayed on said display means.

4. The information distribution system as claimed in claim 1, further comprising:
schedule correcting means interconnected to said terminal apparatus, said schedule transmitting apparatus, and said display information transmitting means for correcting the schedule stored in said transmission schedule storage means or display information stored in said transmitting display information storage means.

5. The information distribution system as claimed in claim 1, wherein:
said display information transmitting means further comprises encryption means for encrypting said display information; and
said terminal apparatus further comprises decryption means for decrypting said encrypted display information encrypted by said encryption means.

6. The information distribution system as claimed in claim 1, wherein:
said terminal apparatus further comprises last display information transmitting means for transmitting to said display information transmitting apparatus the last display information designating the display information displayed at said display means when an operation by a user is carried out while displaying said last display information; and
said display information transmitting apparatus further comprises counting means for counting the transmissions of said display information and transmitting the count as another display information when the last display information is transmitted from said terminal apparatus.

7. The information distribution system as claimed in claim 1, wherein:
a plurality of schedule tables is stored in said transmission schedule storage means; and
said terminal apparatus further comprises schedule table selecting means for selecting a schedule table to which the schedule to be transmitted by said schedule transmitting apparatus belongs.

8. A terminal apparatus interconnected with a display information transmitting apparatus for transmitting display information and a schedule transmitting apparatus for transmitting a schedule over a network, comprising:
display means for displaying the display information;
an internal clock for giving a lapse of time;
a screen saver for displaying a given image on the display means when an operation to the terminal apparatus by a user is suspended for a certain period of time or longer;
time of day transmitting means for transmitting the time of day given by the internal clock to the schedule transmitting apparatus when the given image is displayed on the display means and when the time of day to end displaying the given image is close;
schedule receiving means for receiving a first schedule comprising a set of a display start time that specifies a time of day to start displaying the display information, an address that identifies the display information, a display end time that specifies a time of day to end displaying the display information and/or a display period that specifies a time duration required to display the display information;
schedule storage means for storing the first schedule received by the schedule receiving means;
display information transmission request transmitting means for transmitting a display information transmission request to the display information transmitting apparatus with reference to the address listed in the first schedule when the time of day given by the internal clock reaches the display start time listed in the first schedule stored in the schedule storage means;
display information receiving means for receiving the display information from the display information transmitting apparatus; and
display control means for displaying the display information received by the display information receiving means on the display means,
wherein the display information is capable of being updated by a mobile phone or a Personal Digital Assistant, and
wherein the terminal apparatus periodically sends a schedule transmission request to the schedule transmitting apparatus to request latest schedule information,
said terminal apparatus further comprises:
schedule rewriting means for rewriting the first schedule stored in said schedule storage means with a second schedule received by said schedule receiving means, when a different portion between the first schedule and the second schedule is determined by said terminal apparatus;
said time of day transmitting means transmits the time of day given by the internal clock to the schedule transmitting apparatus at a predetermined interval during the display period when said display information is displayed; and
said schedule rewriting means rewrites said first schedule stored in said schedule storage means with the second schedule received by said schedule receiving means, when a different portion between the first schedule and the second schedule is determined by the terminal apparatus at the time when the second schedule received by said schedule receiving means is transmitted from said schedule transmitting apparatus based on the time of day transmitted to said schedule transmitting apparatus at said predetermined interval, wherein said display information is related to a television or radio program that is on the air during the display period when the display information is displayed on the display means.

9. The terminal apparatus as claimed in claim 8, wherein:

said schedule rewriting means rewrites said first schedule stored in said schedule storage means with the second schedule received by said schedule receiving means, when either said display end time or said display period is different in case of comparing the second schedule received by said schedule receiving means with the first schedule stored in said schedule storage means.

10. The terminal apparatus as claimed in claim 8, further comprising:

display information storage means for storing display information displayed on said display means.

11. The terminal apparatus as claimed in claim 8, further comprising:

decryption means for decrypting said encrypted display information.

12. The terminal apparatus as claimed in claim 8, further comprising:

a last display information transmitting means for transmitting to said display information transmitting apparatus the last display information designating the display information displayed at said display means when an operation by a user is carried out while displaying said display information.

13. A schedule transmitting apparatus interconnected with a terminal apparatus and a display information transmitting apparatus for transmitting display information to the terminal apparatus over a network, comprising:

transmission schedule storage means for storing a schedule table that lists a plurality of schedules each of which is composed of a set of a display start time that specifies a time of day to start displaying the display information, a display end time that specifies a time of day to end displaying the display information, a display period that specifies a time duration required to display the display information on a display means mounted to the terminal apparatus and an address that identifies the display information;

retrieval means for retrieving, from the schedule table, a schedule display start time of which is close to a time of day transmitted from the terminal apparatus, upon reception of the time of day from the terminal apparatus; and schedule transmitting means for transmitting the schedule retrieved by the retrieval means to the terminal apparatus, wherein the display information is capable of being updated by a mobile phone or a Personal Digital Assistant, and wherein the terminal apparatus periodically sends a schedule transmission request to the schedule transmitting apparatus to request latest schedule information, said terminal apparatus further comprises:

schedule rewriting means for rewriting a first schedule stored in a schedule storage means with a second schedule, when a different portion between the first schedule and the second schedule is determined by said terminal apparatus;

time of day transmitting means for transmitting a time of day given by an internal clock to the schedule transmitting apparatus at a predetermined interval during the display period when said display information is displayed; and said schedule rewriting means rewrites said first schedule with the second schedule, when a different portion between the first schedule and the second schedule is determined by the terminal apparatus, at the time when the second schedule received, is transmitted from said schedule transmitting apparatus based on the time of day transmitted to said schedule transmitting apparatus at said predetermined interval, wherein said display information is related to a television or radio program that is on the air during the display period when the display information is displayed on the display means.

14. The schedule transmitting apparatus as claimed in claim 13, wherein:

said transmission schedule storage means stores a plurality of schedule tables.

15. A display information transmitting apparatus connected with a terminal apparatus over a network, comprising:

transmitting display information storage means for storing display information to be transmitted to the terminal apparatus; and display information transmitting means for transmitting the display information stored in the transmitting display information storage means to the terminal apparatus upon reception of a display information transmission request transmitted from the terminal apparatus with reference to an address, wherein the display information is capable of being updated by a mobile phone or a Personal Digital Assistant, and wherein the terminal apparatus periodically sends a schedule transmission request to a schedule transmitting apparatus to request latest schedule information of the display information, schedule rewriting means for rewriting a first schedule stored in a schedule storage means with a second schedule, when a different portion between the first schedule and the second schedule is determined;

time of day transmitting means for transmitting a time of day given by an internal clock at a predetermined interval during a display period when said display information is displayed; and schedule rewriting means for rewriting said first schedule stored in said schedule storage means with the second schedule, when a different portion between the first schedule and the second schedule is determined by the terminal apparatus at the time when the second schedule is transmitted, wherein said display information to be transmitted by said display information transmitting apparatus is related to a television or radio program that is on the air during a display period when the display information is displayed on the display means.

16. The display information transmitting apparatus as claimed in claim 15, further comprising:

encryption means for encrypting said display information.

17. The display information transmitting apparatus as claimed in claim 15, further comprising:

counting means for counting transmissions of said display information and transmitting the count as another display information based on the last display information transmitted from said terminal apparatus based on the last display information designating the display information displayed on said display means.

18. An information distribution method adaptable to an information distribution system configured by interconnecting a terminal apparatus, a display information transmitting apparatus and a schedule transmitting apparatus over a network, comprising the steps of:

allowing the terminal apparatus to transmit a time of day given by an internal clock, which gives a lapse of time, to the schedule transmitting apparatus, while displaying a given image on display means when an operation to the terminal apparatus by a user is suspended for a certain period of time or longer;

allowing the schedule transmitting apparatus to, upon reception of the time of day from the terminal apparatus, transmit a first schedule to the terminal apparatus by retrieving, from schedules comprising a set of a display start time that specifies a time of day to start displaying the display information, a display end time that specifies a time of day to end displaying the display information, a display period that specifies a time duration required to display the display information and an address that identifies the display information, whose display start time is close to the time of day transmitted from the terminal apparatus;

allowing the terminal apparatus to, upon reception of the first schedule, store the first schedule in a recording medium, while transmitting a display information transmission request to the display information transmitting apparatus with reference to the address listed in the first schedule when the time of day given by the internal clock reaches the display start time listed in the first schedule stored in the recording medium;

allowing the display information transmitting apparatus to, upon reception of the display information transmission request, transmit the display information to the terminal apparatus; and allowing the terminal apparatus to, upon reception of the display information from the display information transmitting apparatus, display the received display information on the display means, wherein the display information is capable of being updated by a mobile phone or a Personal Digital Assistant, and wherein the terminal apparatus periodically sends a schedule transmission request to the schedule transmitting apparatus to request latest schedule information, wherein said terminal apparatus transmits the time of day given by the internal clock to the schedule transmitting apparatus at a predetermined interval during a display period when said display information is displayed;

said schedule transmitting apparatus retrieves a second schedule by receiving the time of day transmitted by said terminal apparatus, and transmits to the terminal apparatus the second schedule which has a start time close to the time of day transmitted by said terminal apparatus; and said terminal apparatus receives the second schedule transmitted by said schedule transmitting apparatus, and rewrites the first schedule stored in a recording medium with the second schedule, when a different portion between the first schedule and the second schedule is determined by the terminal apparatus, wherein said display information is related to a television or radio program that is on the air during the display period when the display information is displayed.

19. The information distribution method as claimed in claim 18, wherein:

said terminal apparatus rewrites said first schedule stored in said recording medium with the second schedule, when either said display end time or said display time is different in case of comparing the second schedule with the first schedule stored in said recording medium.

20. The information distribution method as claimed in claim 18, wherein:

said terminal apparatus records to the recording medium the display information transmitted by said display information by said display information transmitting means.

21. The information distribution method as claimed in claim 18, further comprising:

schedule correcting means interconnected to said terminal apparatus, said schedule transmitting apparatus, and said display information transmitting means for correcting either the schedule to be transmitted by said schedule transmitting apparatus or display information to be transmitted by said display information transmitting apparatus.

22. The information distribution method as claimed in claim 18, wherein:

said display information transmitting apparatus encrypts said display information; and said terminal apparatus decrypts said encrypted display information.

23. The information distribution method as claimed in claim 18, wherein:

said terminal apparatus transmits to said display information transmitting apparatus the last display information designating display information displayed at said display means when an operation by a user is carried out while displaying said display information; and said display information transmitting apparatus counts the transmissions of said display information and transmits the number as another display information based on the last display information transmitted from said terminal apparatus.

24. The information distribution method as claimed in claim 18, wherein:

a plurality of schedule tables is stored in the recording medium equipped to said schedule transmitting apparatus; and said terminal apparatus selects a schedule table to which the first schedule to be transmitted by said schedule transmitting apparatus belongs.

* * * * *